Inventors.
John H. O. Harries
Walter T. Welford
By Ralph B. Stewart
Attorney

Inventors
John H. O. Harries
Walter T. Welford
By Ralph B. Stewart
Attorney

Inventors
John H. O. Harries
Walter T. Welford
By Ralph B. Stewart
Attorney 2,999,126

FACETTED CORRECTION LENS FOR MINIMIZING KEYSTONING OF OFF-AXIS PROJECTORS

John Henry Owen Harries, Warwuck, Bermuda, and Walter Thompson Welford, Blackheath, London, England, assignors to Harries Television Research Limited, Hamilton, Bermuda, a British company Filed May 19, 1959, Ser. No. 814,206
Claims priority, application Great Britain May 29, 1958
28 Claims. (Cl. 178—5.4)

In optical systems it is sometimes desirable to employ an "oblique projection system," that is to say, a system in which the optical axis is not normal to the viewing screen where it meets the latter. This need is particularly felt in projection television systems, both for colour and monochrome reproduction. In colour television projection systems employing a number of separate projections, the optical axes of the three projectors cannot all be normal to the viewing screen; while in monochrome television systems a more compact television receiver may be produced if oblique projection is used because, for example, it is sometimes difficult to accommodate all the components of a television set in the spaces left on each side of a centrally located normally projected system without obstructing the light beam. A need for oblique projection systems also exists with respect to photographic and cinematographic applications. Although often desirable, obliquity of the optical axis has been employed only to a very limited extent since it results in an unsymmetrical distortion of the image on the projection screen in which the part of the image towards which the axis is inclined is compressed both horizontally and vertically and the other part is extended both horizontally and vertically. This distortion (which we shall refer to in this specification as "keystone" distortion) may be accompanied by pincushion or barrel distortion in which the sides of the image become concave or convex. In many applications, such as domestic television receiving systems and cinematographs, there is a special difficulty in that the optical projection system should, if possible, have only a short "throw," that is to say, the optical path between the projector and the viewing screen should be quite short. A small lateral displacement of the projector will then result in a far greater obliquity of the optical axis then would be the case in long-throw systems (such as a cinema projection system in a theatre) and the distortions would, therefore, be far greater. The distortions are particularly undesirable in colour television and colour cinematograph systems which use three projectors, one for each primary colour, since the different colours will not be in exact register away from the centre of the screen. It is believed that these difficulties have resulted, for example, in a reduction of interest in three tube colour television receiving systems, despite certain advantages of these systems, and a concentration of effort on receiving systems employing a single tube, for example, systems in which the colour tube has a tri-colour phosphor dot screen, aperture mask and three electron guns. The present invention (although not confined to oblique projection television systems) has for one of its objects to reduce the distortion in such systems to within acceptable limits.

In the case of optical systems which are not oblique it is theoretically possible to correct barrel or pincushion distortion by suitable combinations of lenses, and, in addition, we have found that very strong distortion of this kind can be corrected by means of a suitably shaped aspheric plate placed at a considerable distance from an aperture stop in the system. It might be supposed by analogy that the asymmetrical keystone distortion found with oblique projection systems could be similarly corrected by, for example, a plate or lens system of suitable shape. We have found, however, that it is not possible to correct the keystone distortion of oblique projection systems by this means.

We have found that the reason for the failure of lens combinations or aspheric plates, to correct the keystone distortion of oblique projection systems is that there is, in fact, no possible shape of the continuous surface of any lens or aspheric plate which will do this. We may exemplify this by considering a simple case very near the axis of an oblique optical system. Assume that a refracting plate intended to correct keystone distortion is placed on the optical axis with its face perpendicular to that axis. Let us take co-ordinate axes $x$ and $y$ in the plane of the face of the plate, and an axis $z$ perpendicular to $x$, $y$. We have found that the components of the slope which the refracting surface should have at any point $(x, y)$ on the surface of the plate to correct keystone distortion will be given by the partial differential equations $$\frac{\partial z}{\partial x}=Cy^2$$

$$\frac{\partial z}{\partial y}=Cxy$$

where C is a constant. Thus, it might be expected that the form of the refracting surface of the plate would be given by some equation $z=f(x, y)$ which would be a solution of these differential equations with appropriate boundary conditions; but, unfortunately, these differential equations were found to constitute a Pfaffian system and no solution exists in the form $z=f(x, y)$. This means that we have proved that there is no continuous surface of a lens or corrector plate such that the components of the gradient vary in accordance with the above differential equation and this, in turn, leads to an apparent impasse because it means that keystone distortion in oblique projection systems cannot be solved by any known optical element, for example a lens, prism or aspheric plate.

We have also found, however, that to achieve definition of the kind commonly necessary in television receiving systems, the optical projection system need not be of exceptionally high grade and we have utilised this fact to circumvent the impasse.

According to the invention, in an oblique optical system a distortion correcting device is used having a surface which varies in slope and is composed of a number of facets separated by lines of discontinuity of slope the gradients of each facet being such that the path of a bundle of rays arriving at that facet from the object in the optical system are modified so as to displace the points of arrival of the rays at the image surface into such positions that keystone distortion is substantially avoided. In addition, the slope of each facet may be modified to include additional corrections for other distortions, such as pincushion distortion. The facets must be small enough to provide a reasonable change of gradient over the surface of the device or the distortion will not be sufficiently counteracted, and the facets must not be so small as to produce diffraction effects. We have found that the abrupt steps at the lines of discontinuity between the facets are not objectionable provided that the distortion correcting element is placed at a sufficient distance from the aperture stop of the system and providing that the image is not required to be of much better definition than is commonly found in television systems. The invention is applicable to oblique projection on to screens of any shape.

The facets can be in the form of squares, triangles or hexagons or any two-dimensional design, the design being governed in general by manufacturing convenience. The gradient will, in general, change more rapidly in some parts of the device than in others, and it may, therefore, in many instances be convenient to use smaller facets in the parts where the gradient changes rapidly and to use larger facets elsewhere.

The slope or gradient of each facet, its position and shape, can be calculated by the usual methods of numerical computation used by those skilled in the optical art, guided by the geometry of the optical system and the shape and obliquity of the viewing screen or equivalent element. In greater detail, it is first necessary to decide at which point in the system the facetted corrector should be placed. In order that its effect on the distortion should be as great as possible and on the other aberrations as small as possible, it will be understood by optical designers that it should be placed as far as possible from the aperture stop or exit pupil of the projector, up to, say, half-way to the viewing screen. If it is nearer to the screen its effect on distortion also becomes greatly diminished. There will be other considerations, such as the close proximity of other projectors, which set a lower limit to the distance from the screen. Thus a definite position is found.

Next a series of principal rays is calculated and the rays are traced from the optical object to the screen (excluding for the moment the corrector element) at different distances from the axis, and the distortion, including both ordinary barrel or pincushion and keystone, is calculated. This must be done at sufficiently close spacings as will be found by experience to give enough data for computing the facets and rays which must be taken in a number of meridian planes at suitable angles to that one which is perpendicular to the screen. The method of ray-tracing and calculation of distortion can be any one of a number well-known to optical designers.

Next, for any given ray the point in which it ought to have met the screen if there had been no distortion is found and from this it is possible to calculate the inclination to the normal which the surface of the corrector facet should have where this ray meets it. This is done by assuming an index of refraction for the corrector corresponding to a material of which it is convenient to make it (such as polymethyl methacrylate) and applying Snell's law of refraction, to find the required wedge angle of the corrector facet. The angle can be on either surface of the plate, but in order to reduce astigmatism it is better to have it on the side nearer the viewing screen if there is pincushion distortion to be corrected in addition to keystone, and on the other side if there is barrel distortion.

This wedge angle must then be determined for each facet by interpolating as necessary between the angles found for the principal rays traced. The number of facets is chosen by arranging that the jump in ray deviation between neighbouring facets corresponds to less than a picture point on the screen.

In the important and most usual case in which an image is projected obliquely on to a plane screen then, in the absence of the correcting device according to the invention, a rectangle in the object plane of the projector system is transformed into a keystone-shaped image as mentioned above and we have noticed that this distortion is such that image points are displaced radially from their correct position. This radial displacement of the image points has led us to a simplification in the design of the correcting device, which can in this instance consist of a number of radial sectors. This simplifies the manufacture of the device, each sector of which is a portion of a different axially symmetric surface, and has a slope which changes over the sector, in the radial direction, in a continuous manner. The sectors are separated by lines of discontinuity of slope. The corrector plate will be symmetrical about a certain diametral axis which will correspond to the axis of symmetry of the keystone effect.

To calculate the form of a corrector plate comprising a number of radial sectors, a set of wedge angles are determined as explained above for the principal rays in any one meridian plane and are regarded in the case of each radial sector as defining a continuous surface. Thus if the polar co-ordinates of the meridian section of this surface are $(\rho, \phi, z)$, $\phi$ being the azimuthal angle defining the meridian plane, we have $$\frac{dz}{d\rho}=\tan\theta$$

where $\theta$ is the wedge angle determined as before. Thus $z$ is determined as a function of $\rho$ by numerical integration. The number of sectors is determined as above and if, as will generally be the case, there are no sets of wedge angles $\theta$ for all the values of $\phi$ required, the missing values are found by fitting the available values of $\theta$ for a given $\rho$ to a Fourier series in $\phi$ by well-known methods and interpolating for the other values of $\phi$ from this.

The distortion near the centre of the image was found to be small and, therefore, the central region of the correction plate may be substantially flat and the inner ends of the sectors which make up the central region can in many instances be replaced by a flat disc to simplify the process of manufacture.

In addition to the keystone distortion found in oblique projection systems, pincushion or barrel distortion may occur. Any facetted or segmented correcting device in accordance with the present invention can be appropriately modified by altering the components of slope of its facets, as explained above, to take into account the correction necessary to remove pincushion or barrel distortion.

Although it is expected that the facetted correction plate according to the invention will find its principal application in mirror projection systems, the use of a facetted correction device in lens projection systems may in some cases be desirable.

In some instances oblique optical systems having facetted correction devices in accordance with the present invention may be used in combination with other projection devices which are not oblique and which have their optical axes normal to the viewing screen. According to a subsidiary feature of the invention, barrel or pincushion distortion can be eliminated in these latter non-oblique systems by the use of an aspheric correcting plate placed as far from the stop or centre of projection as possible in order to keep as low as possible any other aberrations introduced by the plate. The design of the distortion corrector is carried out by determining the angle through which the principal ray at each point of the plate must be bent in the manner already described with respect to facetted plates; the slope of the surface is to a first approximation proportional to this angle and a more exact calculation can be made using the well-known law of refraction.

In oblique projection systems which include a facetted distortion corrector in accordance with the present invention, and which are of short focal length and small depth of focus, it is advantageous to tilt the phosphor screen, transparency or other surface forming the object of the optical system in such a manner that the focusing of the image, from the side nearest to the projector to the side furthest therefrom, is rendered more uniform. In lens projection systems, for example, the screen is tilted about an axis perpendicular to the optical axis of the projector, in such a manner that the angle made by the plane of the screen with the plane of the object is increased.

In order that the invention may be better understood several embodiments will now be described, by way of example, with reference to the accompanying drawings, in which.

Figure 1A:
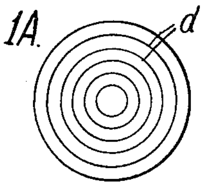
FIGURES 1A and 1B show two facetted distortion correction plates.
Figure 1B:
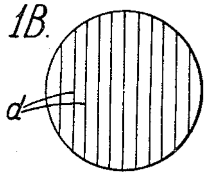

In FIGURE 1A the facets of the distortion correction plate consist of concentric rings separated by concentric lines $d$ of discontinuity of slope. FIGURE 1B shows facets which run in parallel straight paths across the distortion corrector and are separated by straight lines $d$ of discontinuity of slope. These plates can be used in systems for projecting obliquely on to a plane screen, and in such a case, each facet will slope in both senses. Each facet of the plate of FIGURE 1A will slope radially as well as along its circular path, and each facet of FIGURE 1B will slope in two mutually perpendicular directions. These correction plates can be injection moulded from polymethyl methacrylate, for example that known as "Perspex," made by Imperial Chemical Industries Limited, of England, or that known as "Plexiglas" and made by Rohm & Haas, of Philadelphia, United States of America.

Figures 2A, 2B, 4:
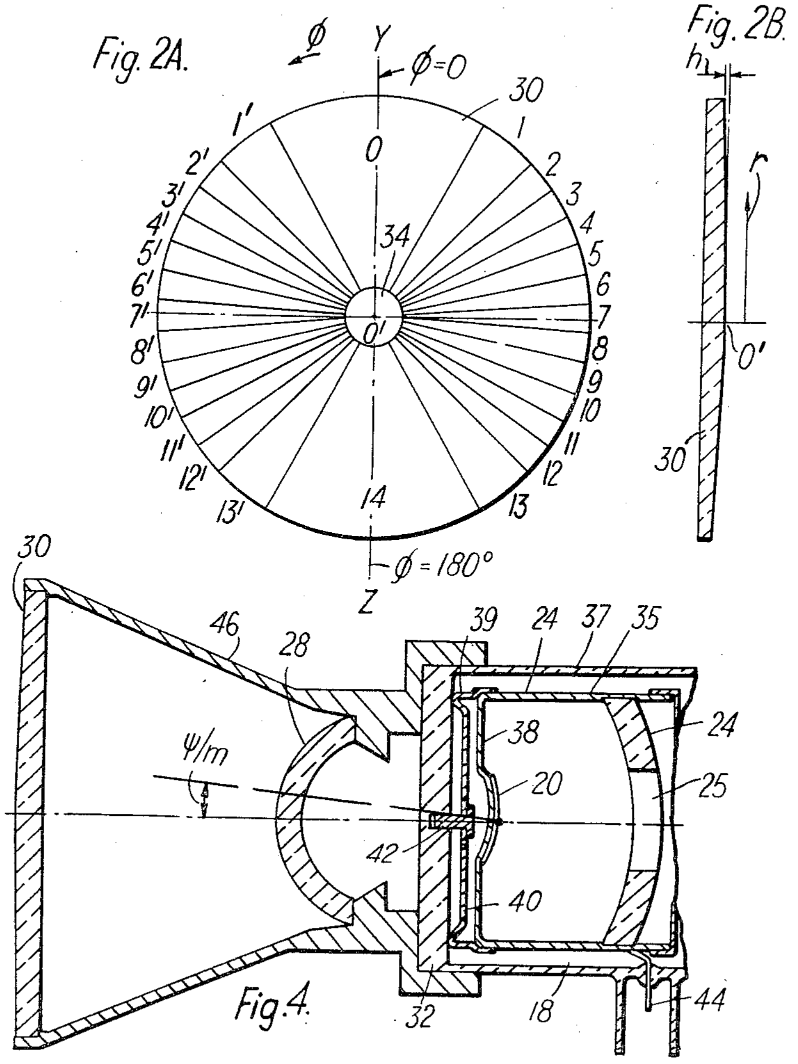
FIGURE 2A shows a further facetted distortion correction plate in which the facets have the form of sectors.
FIGURE 2B is a sectional view of the plate shown in FIGURE 2A.
FIGURES 4, 5A, 5B and 5C show constructional details of the cathode ray tube and optical system of FIGURE 3A.

FIGURE 2A shows a correction plate which consists of a number of radial sectors or facets and which is particularly suitable for use when an image is projected obliquely on to a plane screen because, as explained above, each sector slopes only in the radial sense. FIGURE 2B shows a section through the plate of FIGURE 2A. This correction plate may, for example, be used in the television reception system which is illustrated diagrammatically in FIGURE 3, and includes a cathode ray tube the envelope of which is shown at 18. This cathode ray tube is of a kind described more fully in co-pending application Serial No. 780,421, and includes within its vacuum envelope a convex phosphor screen and a concave mirror which reflects light from the phosphor screen through the transparent face of the tube, but in FIGURE 3 the arrangement is modified to make it more suitable for oblique projection. The advantages of such a tube are explained in the above-mentioned co-pending application.

Figures 3, 5A, 5B, 5C, 8A, 8B:
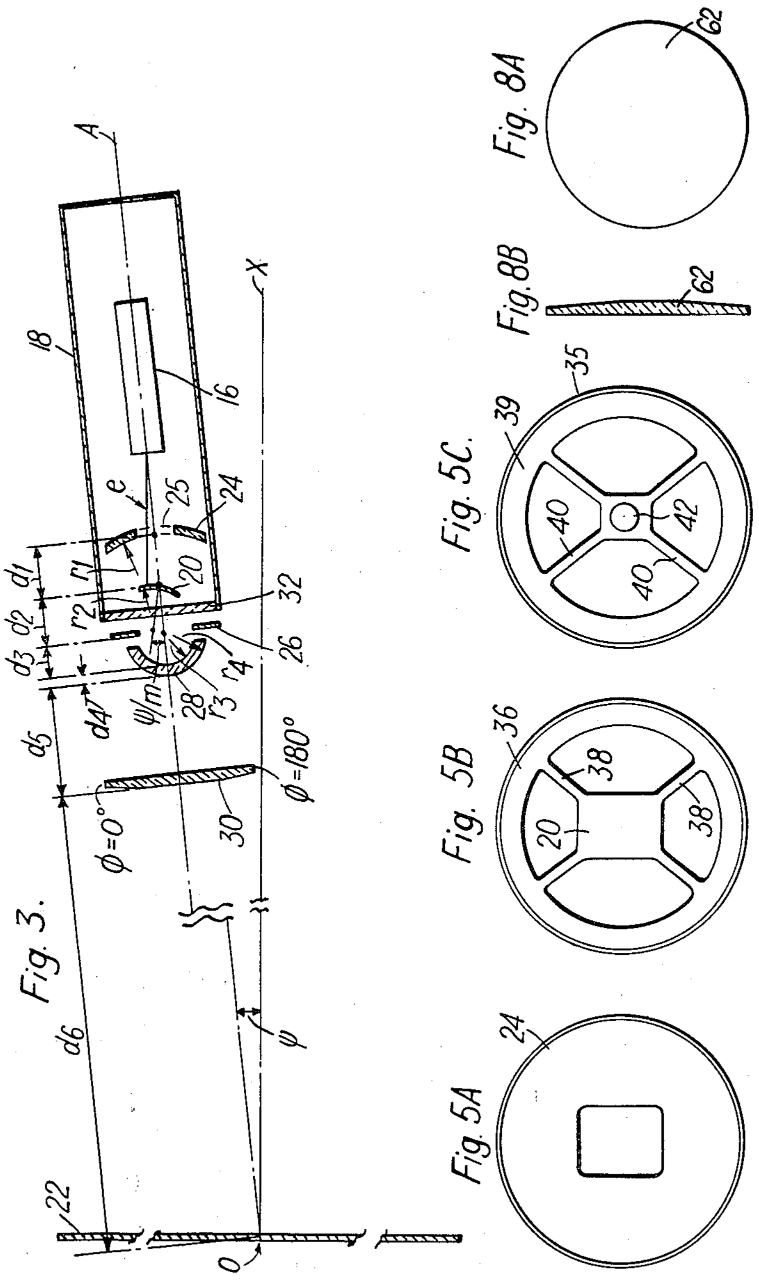
FIGURE 3 shows diagrammatically a television receiving system employing a single cathode ray tube and associated optical system having its optical axis arranged obliquely with respect to the viewing screen.
FIGURE 8A represents the aspheric distortion correction plate used with the centre tube of the receiver of FIGURE 7.
FIGURE 8B is a sectional view of the plate shown in FIGURE 8A.

In FIGURE 3 the electron gun 16 within the envelope 18 produces an electron beam $e$ which is scanned by conventional beam-deflection means (not shown) over the convex phosphor screen 20. Assuming the electron beam to be modulated by a video signal, the resulting image on the phosphor screen is projected on to a plane diffusing viewing screen 22, by means of a modified Schmidt optical system comprising an aluminised spherical concave mirror 24 having a central aperture 25 through which the electron beam $e$ passes, an optical stop 26, a meniscus 28 and a distortion correction plate 30 of the kind shown in FIGURE 2. The vacuum tube envelope 18 has a glass window 32. The axis OA of this optical system is inclined to the normal OX to the viewing screen at an angle of obliquity $\psi$ which in the optical system under consideration is 6°. The phosphor screen 20 is tilted, with respect to the optical axis, about a diametral axis normal to the plane of the paper in FIGURE 3, in order to render more uniform the focusing of the image on the viewing screen 22. The radii $r1$, $r2$, $r3$ and $r4$ of the mirror 24, phosphor screen 20 and the concave and convex surfaces of the meniscus 28, respectively, and the axial distances $d_1$ to $d_6$ indicated on FIGURE 3 may then have the values set out in Table 1.

*Table 1*

| | |
|---|---|
| $r_1$=44.0 mm. | $d_1$=24.8 mm. |
| $r_2$=22.0 mm. | $d_2$=21.2 mm. |
| $r_3$=16.5 mm. | $d_3$=16.5 mm. |
| $r_4$=21.5 mm. | $d_4$=5.0 mm. |
| | $d_5$=43.5 mm. |
| | $d_6$=540 mm. |

Other parameters of the system are given below:

Aluminised spherical mirror 24 is 50 mm. diameter.

Meniscus 28 is 40 mm. diameter. Refractive index 1.523.

Aperture 25 in mirror 12.7 x 17 mm. Optical magnification $m$=29.

Angle of obliquity of the optical axis to the normal to the screen=6.0°.

Calculated value of phosphor tilt angle, neglecting the effect of optical aberrations, =0.21°. Allowance for aberration may be made in any case by experimentally adjusting the angle to obtain the best possible focus.

Size of raster on phosphor 20=12.4 x 16.6 mm.

Size of image on viewing screen 22=360 x 480 mm.

The correction plate shown in FIGURES 2A, 2B; may consist of an injection moulding of polymethyl methacrylate, and may have a diameter of 88 mm. diameter and thickness on the optical axis of approximately 5 mm. One side of the plate is plane and the other side is optically shaped. The latter side faces towards the viewing screen 22 in FIGURE 3. Each of the radial sectors or facets, which are separated by radial lines of discontinuity of slope, is a sector of an aspheric axially symmetric surface and therefore has zero slope along the path of an arc centred on the point O'. The sectors numbered 1 and 1' are identical, as are the sectors numbered 2 and 2', 3 and 3', etc. Table 2 shows the configuration of each radial sector of a plate designed to correct for axially symmetric distortion of the pincushion kind as well as for keystone distortion, as a function of radial distance $r$ and reduction $h$ of the thickness of the sector below the thickness at the axis of the plate, as shown in FIGURE 2B. The central portion 34 of the distortion corrector, consisting of a circular region of 12 mm. diameter, may have plane surfaces on both sides of the disc. This modification will be found to assist manufacture. The angular subtent of segments 0 and 14 is 60°; the angular subtent of sectors 1, 1', 13 and 13' is 16°; and the angular subtents of the rest of the sectors is 8°. The angular position of each of the sectors of the correction plate may be specified in terms of the angle $\phi$, for which the 0° and 180° values are shown by the lines O'Y and O'Z in FIGURE 2A, about which the correction plate is symmetric. This line of symmetry YZ of the correction plate 30 is indicated in FIGURE 3 and lies in the plane containing the optical axis OA and the normal axis OX, that is, it lies in the plane of the paper.

*Table 2*

[Dimensions in millimeters]

| Radius r | Reduction in thickness h | | | | | | | | | | | | | | |
|---|---|---|---|---|---|---|---|---|---|---|---|---|---|---|---|
| | Sector numbers | | | | | | | | | | | | | | |
| | 0 | 1, 1′ | 2, 2′ | 3, 3′ | 4, 4′ | 5, 5′ | 6, 6′ | 7, 7′ | 8, 8′ | 9, 9′ | 10, 10′ | 11, 11′ | 12, 12′ | 13, 13′ | 14 |
| 6 | 0.012 | 0.005 | 0.002 | 0.000 | 0.000 | 0.000 | 0.000 | 0.001 | 0.001 | 0.002 | 0.002 | 0.002 | 0.003 | 0.003 | 0.004 |
| 8 | 0.010 | 0.004 | 0.001 | 0.000 | 0.000 | 0.001 | 0.002 | 0.002 | 0.003 | 0.004 | 0.005 | 0.006 | 0.007 | 0.008 | 0.009 |
| 10 | 0.007 | 0.002 | 0.000 | 0.000 | 0.000 | 0.002 | 0.004 | 0.006 | 0.008 | 0.010 | 0.011 | 0.013 | 0.015 | 0.017 | 0.019 |
| 12 | 0.004 | 0.000 | 0.000 | 0.001 | 0.003 | 0.006 | 0.009 | 0.012 | 0.015 | 0.019 | 0.022 | 0.025 | 0.027 | 0.030 | 0.034 |
| 14 | 0.001 | 0.000 | 0.001 | 0.003 | 0.007 | 0.012 | 0.107 | 0.022 | 0.027 | 0.032 | 0.037 | 0.041 | 0.045 | 0.051 | 0.056 |
| 16 | 0.000 | 0.001 | 0.005 | 0.009 | 0.015 | 0.022 | 0.029 | 0.037 | 0.044 | 0.052 | 0.059 | 0.065 | 0.071 | 0.079 | 0.087 |
| 18 | 0.000 | 0.005 | 0.012 | 0.019 | 0.027 | 0.037 | 0.048 | 0.058 | 0.069 | 0.079 | 0.088 | 0.098 | 0.106 | 0.116 | 0.127 |
| 20 | 0.004 | 0.013 | 0.024 | 0.034 | 0.045 | 0.059 | 0.073 | 0.087 | 0.101 | 0.114 | 0.127 | 0.140 | 0.151 | 0.165 | 0.179 |
| 22 | 0.012 | 0.026 | 0.041 | 0.055 | 0.070 | 0.088 | 0.106 | 0.124 | 0.142 | 0.160 | 0.177 | 0.193 | 0.207 | 0.225 | 0.244 |
| 24 | 0.025 | 0.045 | 0.066 | 0.083 | 0.103 | 0.125 | 0.148 | 0.171 | 0.194 | 0.216 | 0.238 | 0.258 | 0.276 | 0.299 | 0.323 |
| 26 | 0.045 | 0.071 | 0.098 | 0.120 | 0.145 | 0.017 | 0.201 | 0.229 | 0.257 | 0.285 | 0.311 | 0.336 | 0.358 | 0.387 | 0.416 |
| 28 | 0.072 | 0.105 | 0.139 | 0.166 | 0.197 | 0.230 | 0.264 | 0.299 | 0.333 | 0.367 | 0.399 | 0.428 | 0.455 | 0.489 | 0.525 |
| 30 | 0.108 | 0.149 | 0.190 | 0.223 | 0.260 | 0.300 | 0.341 | 0.382 | 0.423 | 0.462 | 0.500 | 0.535 | 0.567 | 0.608 | 0.650 |
| 32 | 0.154 | 0.203 | 0.252 | 0.292 | 0.335 | 0.382 | 0.430 | 0.478 | 0.526 | 0.572 | 0.616 | 0.657 | 0.695 | 0.742 | 0.792 |
| 34 | 0.210 | 0.268 | 0.326 | 0.372 | 0.422 | 0.476 | 0.532 | 0.588 | 0.643 | 0.697 | 0.748 | 0.796 | 0.839 | 0.894 | 0.950 |
| 36 | 0.277 | 0.345 | 0.412 | 0.465 | 0.523 | 0.585 | 0.648 | 0.712 | 0.776 | 0.837 | 0.895 | 0.950 | 0.999 | 1.061 | 1.126 |
| 38 | 0.355 | 0.434 | 0.511 | 0.571 | 0.636 | 0.707 | 0.779 | 0.851 | 0.923 | 0.992 | 1.058 | 1.119 | 1.174 | 1.245 | 1.317 |
| 40 | 0.446 | 0.536 | 0.622 | 0.690 | 0.764 | 0.842 | 0.923 | 1.004 | 1.085 | 1.162 | 1.236 | 1.304 | 1.366 | 1.444 | 1.525 |
| 42 | 0.549 | 0.650 | 0.747 | 0.822 | 0.905 | 0.992 | 1.082 | 1.172 | 1.261 | 1.347 | 1.428 | 1.504 | 1.572 | 1.659 | 1.749 |
| 44 | 0.665 | 0.777 | 0.884 | 0.968 | 1.059 | 1.155 | 1.254 | 1.354 | 1.451 | 1.546 | 1.636 | 1.719 | 1.794 | 1.889 | 1.987 |

This table of dimensions applies only to the correction plate designed for the optical system shown in FIGURE 3 and having the dimensions set out in Table 1. However, it will be clear to those skilled in the art that the dimensions of correction plates for other oblique optical systems can be calculated along the lines previously indicated.

The mould used to make the distortion correction plates of FIGURES 1A, 1B and 2A, 2B by injection moulding may be made of steel with highly polished surfaces protected by chrome plating. It may be made in sections, one for each facet. Thus, referring, for example, to FIGURE 2A, the mould may be constructed out of radial sectors each cut from an axially asymmetric cavity and joined together, with a plane disc 34 in the centre.

FIGURES 4, 5A, 5B and 5C show details of a suitable form of construction for a part of the optical system shown in FIGURE 3. The spherical mirror 24 and the phosphor screen 20 are mounted within a metal cylinder 35 arranged coaxially within the envelope 37 of the cathode ray tube 18. The phosphor screen 20 is connected to the metal cylinder by means of a metal ring 36 (FIGURE 5B) and spider arms 38, which are made as thin as possible in order to obstruct as little as possible of the light from the mirror 24. The metal cylinder 35 has an outer annular ring 39 which abuts against the transparent window 32 of the tube and is connected to this window by a central pin 42, to which the annular ring 39 is connected by spider arms 40. The spider arms 40 are located immediately behind the spider arms 38. Electrical connection is made to the metal cylinder by means of a conductor 44. The optical stop 26 forms part of an insulating casing 46 which is cemented to the moulded glass window 32 and which houses the meniscus 28 and the correction plate 30. The phosphor screen is tilted with respect to the optical axis through an angle equal to the angle of obliquity of the optical axis with respect to the normal to the viewing screen (see FIGURE 3) divided by the magnification. This angle is exaggerated in FIGURE 4 for the sake of clarity.

Figures 6A, 6B, 6C:
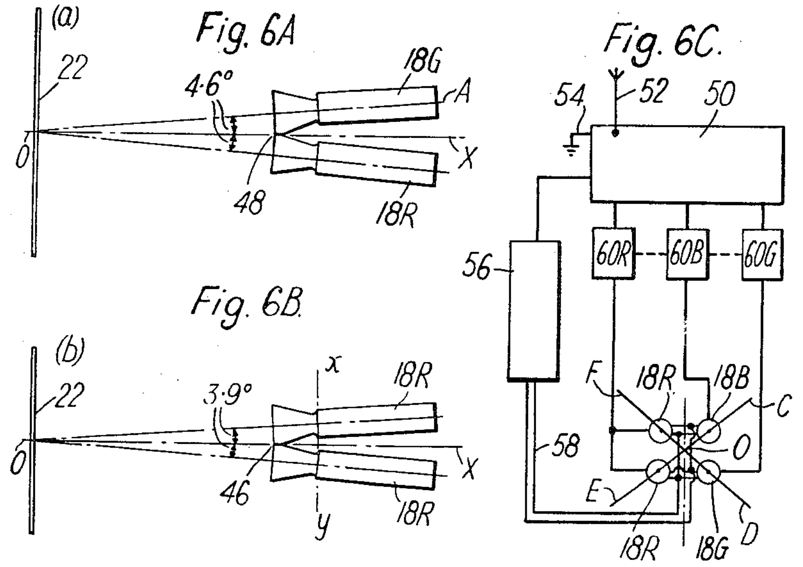
FIGURES 6A, 6B and 6C represent diagrammatically a plan view, side elevation and a sectional view of a colour television receiving system.

FIGURES 6A, 6B and 6C show diagrammatically a plan view, side elevation and a sectional view, respectively, of a colour television receiving system which uses the optical system and vacuum tube shown in FIGURES 2A, 3 and 4 and having the dimensions set out in Tables 1 and 2. Four colour tubes are used, a tube 18G having a green phosphor screen, a tube 18B having a blue phosphor screen, and two similar tubes 18R each having a red phosphor screen. The two tubes 18R are used in parallel so that their light outputs are added at the viewing screen, in order to counteract the relatively low luminance efficiency of red colour phosphors. Each tube and its optical system, including the correction plate, lies along an optical axis such as OA (FIGURE 6A). Regarded in the planes OC, OD, OE and OF in FIGURE 6C, each optical axis subtends an obliquity angle of 6° to a normal to the viewing screen in these planes. Regarded in plan view and side elevation the components of this angle of obliquity are 4.6° and 3.9° as shown in FIGURES 6A and 6B. In order to minimise the angle of obliquity the distortion correctors and their holders have been cut away on their adjacent edges as shown at 46 and 48 in FIGURES 6A and 6B. In FIGURE 6C the block 50 represents a colour television receiver with an antenna 52 and ground 54. The block 56 represents the usual synchronised scanning generators which supply the line and frame scanning potentials or currents to the deflection coils or plates (not shown) of the tubes by means of links 58. The red, blue and green video signals are applied by means of circuits represented by the blocks 60G, 60B and 60R to the modulator electrodes (not shown) in the tubes 18G, 18B and the two tubes 18R. It is expected that such a television projection system will usually have a short length from projector to screen, so that the depth of focus will also be short. The phosphor screens in each tube are, therefore, tilted through a small angle as described above and as shown diagrammatically in FIGURES 3 and 4 to minimise the defocussing at the sides of the image.

Figure 7:
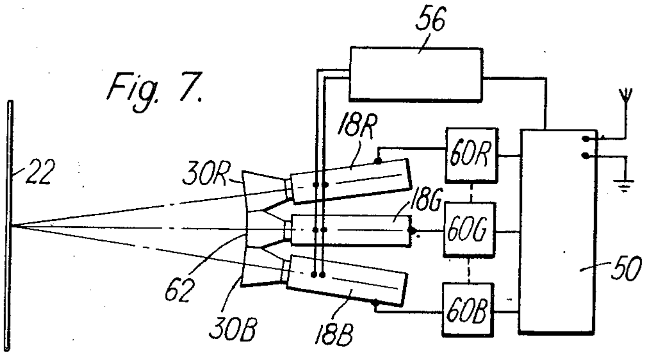
FIGURE 7 shows an alternative arrangement of the colour tubes in a colour television receiving system.

FIGURE 7 shows another colour television system having three cathode ray tubes 18G, 18B and 18R having green, blue and red phosphor screens respectively, and provided with corresponding optical projection systems. The blocks 50, 56, 60G, 60B and 60R have the same purpose as in the case of FIGURE 6. Radial distortion correction plates of the general kind shown in FIGURE 2A may be used in tubes 18R and 18B, although owing to the different angle of obliquity the dimensions of the plates would be different from those given in Table 2. The centre tube 18G is not obliquely arranged with respect to the viewing screen, and therefore, no keystone distortion will appear in the case of tube 18G and its associated optical system. Pincushion or barrel distortion may, however, occur. According to a subsidiary feature of the invention this distortion is substantially corrected by introducing into the optical path of tube 18G a suitably shaped aspheric plate having a surface the slope of which changes in a discontinous manner. This is the plate 62 in FIGURE 7 and is at the same position along the optical axis of tube 18G as the facetted distortion correction plates 30R and 30B along the optical axes of tubes 18R and 18B.

A suitable aspheric distortion correction plate 62 (which may be injection moulded from polymethyl methacrylate) is shown diagrammatically in FIGURES 8A and 8B. The design of this distortion corrector is carried out by determining, in a manner which will be obvious to those skilled in the art, the angles through which the bundles of rays at each point of the plate must be bent to eliminate pincushion or barrel distortion. It is found that if a facetted distortion correction plate of the general type of that shown in FIGURE 2A is used with the tubes 18R and 18B of FIGURE 7, then the gradients over any radius of the optical surface of the aspheric distortion correction plate 62 used with tube 18G will be the same as the gradients over any radius of the sectors 7 and 7′ of the facetted distortion correction plate; that is, the surface of the plate 62 will be the same shape along all radii as the surface of the two facets 7, 7′ of the facetted correction plate which lie perpendicular to the axis of symmetry YZ in FIGURE 2A.

The vacuum tube 18G having a green phosphor screen is chosen to occupy the central position in FIGURE 7, in which the optical axis is normal to the viewing screen 22, because it is known that the red and blue component images of a colour picture are less critical as regards definition and focus than the green component image, and in the event that the facetted distortion correction plates used in the red and blue optical systems of FIGURE 7 cause an accidental reduction of definition, as compared with the definition of the green optical system which has a distortion corrector with no facets, it follows that the effect of the loss of definition will be minimised.

As already described in connection with FIGURES 3 and 4, by combining the use of the facetted correction plate with the tilting of the phosphor screen in an obliquely arranged projection unit of a television receiving system (or each of the obliquely-arranged projection units), any distortion and defocussing at the sides of the image can be reduced. In the case of a multiple tube projection colour television receiving system, by combining these features in each of the obliquely arranged projection units the accuracy of registration of the three images on the viewing screen can be improved. However, it may not in all cases be necessary to provide for the tilting of the phosphors in all of the projection systems used in FIGURES 6 and 7, because it has been found that a considerable improvement in the appearance of the projected image is obtained in certain cases when only the green image is brought into sharp focus, the improvement provided by the tilt of the additional blue and red images being less noticeable.

A monochrome (black and white) television receiving system employing oblique projection can also be provided, according to the invention, with the facetted correcting device (preferably achromatic) arranged in the path of the light rays in the manner shown in FIGURE 3. If desired, the system may include a plane mirror arranged so that the light rays are deflected through, for example, a right angle, in order to reduce the physical length of the system.

Figure 9:
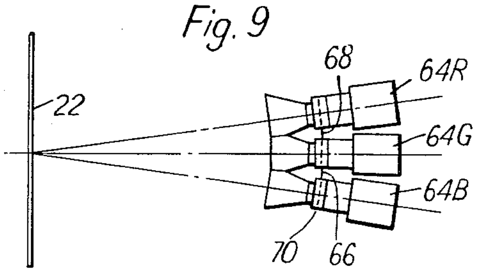
FIGURE 9 shows diagrammatically a cinematograph projector for projecting separate colour films on a common viewing screen.

FIGURE 9 shows an application of the invention to a cinematograph projector. The three projectors, 64R, 64G and 64B respectively produce red, green and blue colour pictures from colour films fed through each projector in the usual way and synchronised by means of the links 66 and 68.

Due to the reversability of optical systems the arrangements in FIGURES 6 and 7 can equally well be used for the transmission of television images as for their reception. In this case camera tubes with photosensitive surfaces and appropriate colour filters may be substituted for the discharge tubes 18R, 18G and 18B shown in these figures, the photosensitive surfaces replacing the phosphors used in these discharge tubes. The blocks 50 then represent a transmitting apparatus and the blocks 60R, 60B and 60G represent camera amplifiers.

In the same way the reversability of optical systems enables the arrangement of FIGURE 9 to operate as a camera device. The element 22 in FIGURE 9 then represents an alluminated colour transparency which is to be photographed, or a scene which is to be photographed in colour. The cinematograph cameras are represented by 64R, 64G and 64B and are arranged to photograph on films 70, through red, blue and green coloured filters, the red, blue and green component colours of the coloured scene.

Although the correction device which has been described takes the form of a light-transmitting plate, it would be possible to construct a distortion correcting mirror having a facetted surface, the gradients of each facet being such that keystone distortion was eliminated in an oblique projection system.

We claim:

1. An optical device for correcting distortion in an oblique optical system, the device having a surface which varies in slope and which comprises a plurality of facets separated by lines of discontinuity of slope, the gradients of each facet being chosen with regard to the bundle of rays which reach that facet from the object in the optical system so as to displace the points of arrival of the rays at an image surface in the optical system into such positions that keystone distortion in the image is substantially avoided.

2. An optical device for correcting distortion in an oblique optical system, the device consisting of a light-transmitting plate having at least one surface which varies in slope and which comprises a plurality of facets separated by lines of discontinuity of slope, the gradients of each facet being such that the paths of a bundle of rays from the object in the optical system which pass through that facet are modified so as to displace the points of arrival of the rays at an image surface in the optical system into such positions that keystone distortion in the image is substantially avoided.

3. A device according to claim 2, in which said facets vary in size, being smaller where the change of gradient is greatest.

4. A device according to claim 2, in which said facets are in the form of radially extending sectors arranged about a common axis, each sector being a sector of an axially symmetrical surface the slope of which varies in the radial direction only.

5. A device according to claim 4, in which the central portion of the surface of said plate, from which said sector-shaped facets radiate, is formed as a plane facet normal to the axis of the device.

6. A device according to claim 4, wherein the angular subtents of said sector-shaped facets vary in magnitude.

7. An optical device for correcting distortion in an oblique optical system, the device consisting of a light-transmitting plate having at least one surface which varies in slope and which comprises a plurality of facets separated by lines of discontinuity of slope, the gradients of each facet being such that the paths of a bundle of rays from the object in the optical system which pass through that facet are modified so as to displace the points of arrival of the rays at an image surface in the optical system into such positions that keystone distortion and axially symmetric distortions in the image are substantially avoided.

8. A device according to claim 7, in which said facets are in the form of sectors extending radially from a central facet in said plate.

9. An oblique optical projection system including an optical device having a surface which varies in slope and which comprises a plurality of facets separated by lines of discontinuity of slope, the gradients of each facet being chosen with regard to the bundle of rays which reach that facet from the object in the optical system so as to displace the points of arrival of the rays at an image surface in the optical system into such positions that keystone distortion in the image is substantially avoided.

10. An oblique optical projection system including a light-transmitting plate having at least one surface which varies in slope and which comprises a plurality of facets separated by lines of discontinuity of slope, the gradients of each facet being such that the paths of a bundle of rays from the object in the optical system which pass through that facet are modified so as to displace the points of arrival of the rays at an image surface in the optical system into such positions that keystone distortion in the image is substantially avoided.

11. An oblique optical projection system according to claim 10 including an optical object which is tilted about an axis perpendicular to the optical axis of said projection system to render more uniform the focusing of said image.

12. A system according to claim 10, in which said projection system is a Schmidt projection system.

13. A television receiver employing an oblique optical projection system which includes a light-transmitting plate having at least one surface which varies in slope and which comprises a plurality of facets separated by lines of discontinuity of slope, the gradients of each facet being such that the paths of a bundle of rays from the object in the optical system which pass through the facet are modified so as to displace the points of arrival of the rays at an image surface in the optical system into such positions that keystone distortion in the image is substantially avoided.

14. A television receiver according to claim 13 including a modified Schmidt optical projection system in which the phosphor screen of an electron discharge tube constitutes the optical object.

15. A television receiver according to claim 13 including an electron discharge tube having a phosphor screen which is tilted about an axis perpendicular to the optical axis of said projection system to render more uniform the focusing of said image.

16. A television receiver employing an oblique optical projection system which includes a light-transmitting plate having at least on surface which varies in slope and which comprises a plurality of facets in the form of radially-extending sector-shaped facets separated by lines of discontinuity of slope, each sector being a sector of an axially symmetrical surface the slope of which varies in the radial direction only, the gradients of each facet being such that the paths of a bundle of rays from the object in the optical system which pass through that facet are modified so as to displace the points of arrival of the rays at an image surface in the optical system into such positions that keystone distortion in the image is substantially avoided.

17. An optical system including an oblique projection system and a projection system having its axis normal to an image surface in said system, the images produced by said oblique and normal projection systems being superimposed at said image surface, said oblique projection system including an optical device having a surface which varies in slope and which comprises a plurality of facets separated by lines of discontinuity of slope, the gradients of each facet being chosen with regard to the bundle of rays which reach that facet from the object in the optical system so as to displace the points of arrival of the rays at an image surface in the optical system into such positions that keystone distortion and axially symmetric distortions in the image are substantially avoided, and said normal projection system including a correction device having an aspheric surface the gradients of which change in a continuous manner and are such that the points of arrival of the rays at the image surface of the system are displaced into positions such that axially symmetric distortions are substantially avoided.

18. A colour television receiving system including a plurality of display devices each adapted to provide a display in a different primary colour, and an oblique optical projection system for each of said display devices, whereby the displays produced by said display devices are superimposed at a common image surface, each optical projection system including a light-transmitting plate having at least one surface which varies in slope and which comprises a plurality of facets separated by lines of discontinuity of slope, the gradients of each facet being such that the paths of a bundle of rays from the object in the optical system which pass through the facet are modified so as to displace the points of arrival of the rays at an image surface in the optical system into such positions that keystone distortion in the image is substantially avoided.

19. A colour television receiver according to claim 18, in which said diplay devices are electron discharge tubes the phosphor screens of which are tilted about axes perpendicular to the optical axis of their respective projection systems to render more uniform the focusing of the images.

20. A colour television receiver according to claim 18, in which said display devices are electron discharge tubes having phosphor screens, and in which only the phosphor screen of the tube which projects the colour requiring the highest definition is tilted about the axis perpendicular to the optical axis of its projection system to render more uniform the focusing of the corresponding image.

21. A colour television receiver according to claim 18, in which at least two of said oblique projection systems are associated with cathode ray tubes adapted to produce images of the same colour, this being the colour of the phosphor having the lowest luminance efficiency.

22. A colour television receiver including a plurality of display devices adapted to provide displays in different primary colours, all but one of said display devices having oblique optical projection systems, said remaining display device having an optical projection system with its axis normal to the image surface, whereby the displays produced by said display devices are superimposed at said image surface, said normal optical projection system including an aspheric correction device the gradients of which change in a continuous manner and are such that the points of arrival of the rays at the image surface of the system are displaced into positions such that axially symmetric distortions are substantially avoided, and said oblique projection systems each including a light-transmitting plate having at least one surface which varies in slope and which comprises a plurality of facets separated by lines of discontinuity of slope, the gradients of each facet being such that the paths of a bundle of rays from the object in the optical system which pass through that facet are modified so as to displace the points of arrival of the rays at an image surface in the optical system into such positions that keystone distortion and axially symmetric distortions in the images are substantially avoided.

23. A colour television receiver according to claim 22, in which the display device which produces a display of the colour requiring the highest definition at said image surface is associated with said normal optical projection system.

24. A television transmitting camera system including an oblique optical system which comprises an optical device having a surface which varies in slope and which comprises a plurality of facets separated by lines of discontinuity of slope, the gradients of each facet being chosen with regard to the bundle of rays which reach that facet from the object in the optical system so as to displace the points of arrival of the rays at an image surface in the optical system into such positions that keystone distortion in the image is substantially avoided.

25. A television transmitting camera system according to claim 24, in which the photosensitive surface of the camera is tilted about an axis perpendicular to the axis of the optical system to render more uniform the focusing of the image.

26. A photographic camera system including an oblique optical system which comprises an optical device having a surface which varies in slope and which comprises a plurality of facets separated by lines of discontinuity of slope, the gradients of each facet being chosen with regard to the bundle of rays which reach that facet from the object in the optical system so as to displace the points of arrival of the rays at an image surface in the optical system into such positions that keystone distortion in the image is substantially avoided.

27. A photographic camera system according to claim 26, in which the film surface is tilted about an axis perpendicular to the axis of the optical system to render more uniform the focusing of the image.

28. An optical element for correcting keystone distortion in an oblique optical system, said element having a light-directing surface divided into a plurality of contiguous facets which vary in surface slope, said facets being bounded by lines of discontinuity of slope and being shaped as sectors arranged radially of a common axis, said sector shaped facets being sloped along their lengths only and in varying amounts to correct said keystone distortion, and said facets being formed in identical pairs arranged on opposite sides of the plane which includes the axis of symmetry of the keystone effect.

References Cited in the file of this patent

UNITED STATES PATENTS

| | | |
|---|---|---|
| 1,753,222 | Timoney | Apr. 8, 1930 |
| 2,216,512 | Fetter | Oct. 1, 1940 |
| 2,566,713 | Zworykin | Sept. 4, 1951 |
| 2,568,543 | Goldsmith | Sept. 18, 1951 |
| 2,601,328 | Rosenthal | June 24, 1952 |